JOSHUA VEASEY.

Improvement in Brake for Carts and Wagons.

No. 118,409.            Patented Aug. 22, 1871.

Witnesses.

Inventor.

118,409

UNITED STATES PATENT OFFICE.

JOSHUA VEASEY, OF HIGHLAND, MAINE.

IMPROVEMENT IN WAGON AND CART-BRAKES.

Specification forming part of Letters Patent No. 118,409, dated August 22, 1871.

*To all whom it may concern:*

Be it known that I, JOSHUA VEASEY, of Highland, in the county of Somerset and State of Maine, have invented a new and useful Improvement in Brakes for Carts and Wagons; and I do hereby declare the following to be a full, clear, and exact description thereof, sufficient to enable others skilled in the art to which my invention appertains to fully understand, make, and use the same, reference being had to the accompanying drawing making part of this specification, in which—

Figure 1:
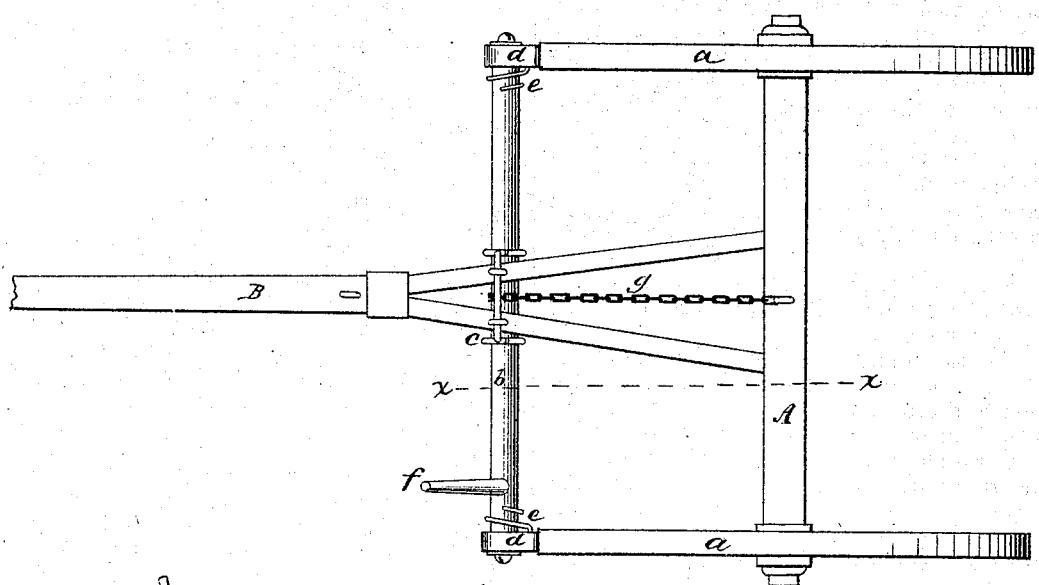
Figure 2:
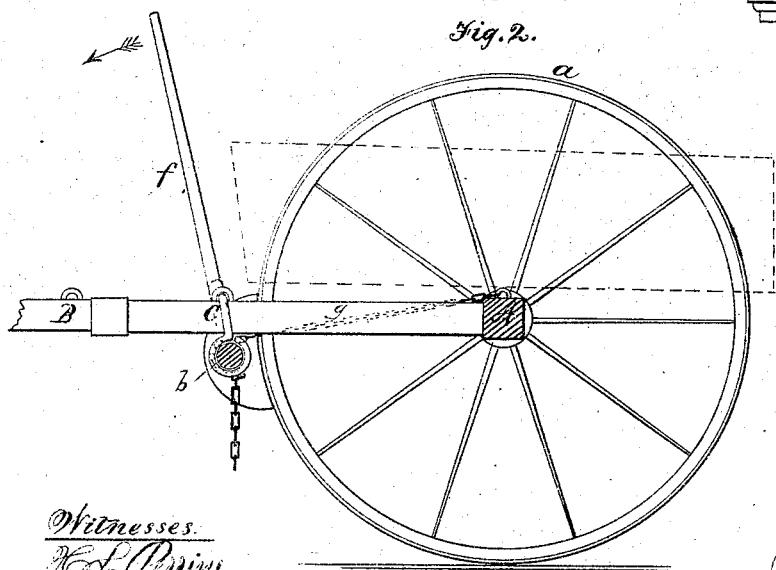

Figure 1 is a top-plan view of my brake as applied to a cart, and Fig. 2 is a sectional view through on line $x\ x$.

My invention relates to a brake for carts, wagons, &c., composed of a bar hung in a bracket attached to the tongue or other part of the cart, which bar is provided with spring-shoes or brake-blocks and a chain connecting the bar with the axle or other part of the vehicle, and so arranged as to afford purchase for the operation of the brake-operating lever.

Referring to the drawing, A may designate the axle of a cart, $a\ a$ the wheels, and B the tongue. $b$ is a bar of wood or metal suspended from the tongue B in a bracket, $c$, which may be made of strong wire, and is secured to the tongue by staples so as to allow it to swing freely. Its ends, extending down from the tongue, are bent or made in a form to suit the shape of the bar $b$, and they hold the bar in the manner shown in Fig. 2. $d\ d$ are shoes or brake-blocks, secured loosely on journals made on the ends of the bar $b$, and in order to keep them in place when not in use springs $e$ are provided, which springs are secured at one end in the bar $b$, and, being coiled around said bar one or more times, or not, as desired, the other end passes through the upper end of the shoes or blocks. $f$ is the operating-lever, placed within ready reach of the driver, or provided with a foot-rest so that it can be operated by the foot; or, if being necessarily placed beyond reach, having a rope or chain connected therewith for operating it. This will be found necessary when the brake is used on the hind wheels of a wagon. In order to give purchase for the lever I provide a chain, $g$, attached at one end to the axle or other part of the cart or wagon, and by the other end to the bar $b$, passing over the bar nearly all the way around it and then being secured to the under part. The bar $b$ is prevented from slipping in the bracket by means of a staple or other device holding the ends of the bracket to the bar.

Thus constructed my brake may be applied to carts, wagons, and other vehicles requiring such a one. It is, however, specially adapted to farmer's use, and owing to its simplicity, cheapness, and great strength will readily commend itself.

An important modification consists in dispensing with the shoes and simply using the bar $b$ with its ends trimmed to fit against the tire of the wheel; this will be found not quite as effectual as with the shoes or blocks, but will do for ordinary work.

The operation is as follows: The lever is pushed down in the direction of the arrow. This moves the bar up toward the wheels; the shoes come in contact with the wheels, and, the lever being pressed, the chain tightens, preventing further pressure; the shoes or blocks are held against the peripheries of the wheels, and the springs $e\ e$, tending to draw the upper end of the shoes away, force still harder against the wheels the lower end. When the lever is released the brake will fall back of its own accord.

Having thus described my invention, what I claim as new and desire to secure by Letters Patent, is—

The combination of the bar $b$, bracket $c$, blocks $d$, lever $f$, and springs $e$ with chain $g$, substantially as and for the purpose set forth.

In testimony that I claim the above I have hereunto subscribed my name before two witnesses.

JOSHUA VEASEY.

Witnesses:
J. C. PAINE,
R. M. MANSUR.